Feb. 10, 1942.   F. HOTCHNER   2,272,947
ANIMATED PICTORIAL DISPLAY
Filed July 24, 1940   3 Sheets-Sheet 1

Inventor
Fred Hotchner

Feb. 10, 1942. F. HOTCHNER 2,272,947
ANIMATED PICTORIAL DISPLAY
Filed July 24, 1940 3 Sheets-Sheet 3

Inventor
Fred Hotchner

Patented Feb. 10, 1942

2,272,947

UNITED STATES PATENT OFFICE 2,272,947

ANIMATED PICTORIAL DISPLAY

Fred Hotchner, Los Angeles, Calif.

Application July 24, 1940, Serial No. 347,129

8 Claims. (Cl. 40—130)

This invention relates to animated pictorial displays and is a continuation in part of my co-pending applications, Serial Nos. 291,188 and 296,792, filed on August 21, 1939, and September 27, 1939, respectively, as to certain forms of the inventions shown therein having common features of novelty set forth and claimed herein. In said applications I have disclosed the principles and construction of animation effect producing devices in which suitably formed refracting members move in front of elongated illuminants to produce the illusion of motion therealong to observers by the manner in which light beams from the illuminants are refracted and caused to sweep the field of view.

In said application, Serial No. 291,188, single refractors are used having each either a single or a plurality of elongated lens elements to condense and distribute the rays of the illuminant. In said application, Serial No. 296,792, refractors are used in pairs, each member of the pair having a plurality of lens elements, and the lenses of the two members variously combining into elemental optical systems with the light source to project elemental beams in groups, thus forming combination beams which are caused to sweep the field of view by the movement of one element respective to the other in front of the illuminant.

The invention as disclosed and claimed herein is directed more particularly to the production of pictorial, scenic, or other more or less complicated effects by the movement of refractors of any of these types, and variously modified, in front of illuminants. The illuminants may be in the outline of the effect which is to be animated. Or they may follow outlines determined, not by the real outline of the effect to appear to view, but some outline which is an optical function of the projected effect. Or they may be used to provide general line source illumination over the general area of the display surface with the illusory effect determined by the construction of the refractors or otherwise. The preferred forms of the invention illustrated in the drawings and described below embody all three of these features which I claim as species of the broad invention hereof.

It is an object of the invention to produce display devices which are simple, highly reliable, low in cost and capable of adaptation to standard types of illuminated display devices with but minor provision for mounting thereto and the supply of current to the driving motor. Displays made according hereto are highly spectacular and have enhanced attraction value as compared with the displays of the prior art, with the illuminants appearing many times as brilliant to the view through the refractors than they do when exposed to direct view.

It is an object to produce the effects by a minimum of movement of the refractors which gives rise to very considerable apparent movement of bright areas across the display surface in simulation of the natural effect imitated. In order to simplify the mechanical details of the device I provide novel mounting and driving means for the moving refractors to reciprocate them with a turning movement across the illuminants to produce an apparent movement in one general direction across the display surface. According to these features devices of the utmost simplicity produce effects ordinarily associated with very considerable mechanism in the public mind.

It is a further object of the invention as exemplified by the novel mechanism illustrated in the drawings to produce speed changes in animation effects, with flaring and flickering illusions typical of a large class of natural effects which are herein generally illustrated by flame designs, two of which are shown in the drawings. By various modifications of the mechanisms shown and application of the principles involved numerous other effects than those shown may be readily produced according to this invention.

It is a further object of the invention to produce displays which are brilliant to view from close and distant points and particularly of increased brilliance to extreme points to a degree comparable to that of searchlights. The function of the lenses of my refractors is to condense the beams crosswise of the illuminants so that the increased intensity is a function of the condensation of the beam into the narrow angle of spread of the projected beam as compared with the sector of light rays thus restrained. The high intrinsic brilliance thus achieved serves to make displays of this type visible and legible at distances far exceeding displays of the prior art and further to clearly represent the animation effect from distant points in its true and undistorted action.

It is an object to provide for efficient utilization of the light rays by providing for the minimum of deviation from the source to the observer through the refracting elements and by various other provisions. In this connection it is to be particularly noted that the effects observed are not due, as in the typical prior art devices to absorption of rays to produce dark and light areas which are generally observable at one time the same from several points of view. On the contrary I provide in my devices for the production of effects by the selective distribution and movement of beams over the field of view with no absorption or other wastage of light rays except that minimum loss incidental to any refracting system due to unavoidable imperfections.

Thus at any one instant of time and from any normal point of view the light pattern over the display surface is produced by beams reaching the observer position from the parts of the display which appear bright to him. The parts which appear dark to him at that instant are areas at which the light is not absorbed, but directed to other parts of the field of view. Observers at other points in the field of view will observe different light patterns, which patterns however are all involved in a sequential effect. Our first observer will see all these patterns during a cycle of operation from his position but in a different phase relation than the other observers. From one instant to the next the dark and light areas will appear to move over the display surface as the beams from the various portions thereof cover and uncover his position.

Still further to increase the efficiency of light utilization I provide in the preferred forms of this invention for the confining of the light beams in a very substantial degree to a field of view which is relatively wide and shallow in accordance with the range of positions from which displays are usually seen. In connection with the use of gaseous conduction lighting tubes, to which this invention is peculiarly adapted, a high degree of control over the field spread may be exercised by the exercise of skill in designing the displays in accordance with the principles herein disclosed with consequent high utilization of the light produced by the tubes in the directions from which the displays are most often viewed.

It is a further object of the invention to produce color change effects, preferably by the use of parallel tubes of contrasting color emission. The refractors may be designed to selectively flash the light from these tubes over the field of view so that observers will see complete color change effects over areas of the display surface, even to the extent of causing differently colored light areas to appear to follow each other along the same course. Variety and brilliance of illusory effect are thus afforded by the features of this invention with simplicity and economy.

Another object of the invention has to do with a novel principle of projection of beams from illuminants which have light sources of considerable width as compared with the dimensions and focal spacing of the lenses. In this connection I provide for the projection of intense beams from lenses which incidentally change in focal spacing as they are moved in front of the lighting tubes, nevertheless projecting the beams over wide fields with high intensity for various angles of divergence.

According to my invention very intense illumination may be applied to the effects as there is practically no limitation to the amount of light which may be developed by luminous tubes. My constructions permit of the use of very intense illuminants without any important changes in mechanism and without imposing any limitations on the illuminants. A high degree of utilization of the light developed is effected with the maximum of radiation sent directly toward the normal field of view. The techniques of the art for intensification of illumination are available without any important limiting conditions.

It is a further object to produce animation effects with very slight mechanical movement of the parts involved, which end is particularly furthered by the use of double refractors in certain embodiments of the invention and the use of novel driving mechanisms described below.

Various other objects of the invention will be apparent from the specification below taken in connection with the drawings.

The invention is shown in the accompanying drawings in certain preferred embodiments which typify its adaptation to electric signs which otherwise follow conventional construction. It is not limited to the forms shown but may be variously adapted to advertising, decorative, or like uses, and variously modified in mechanical details and variously practiced in its methods within the purview of the claims. It is therefore not to be limited to the embodiments shown but only by the prior art and the limitations which appear in the claims.

The device shown in Figures 1 to 4 is the same as one of the devices shown in my copending application, Serial No. 291,188.

The device shown in Figures 11 to 15 is the same as one of the devices shown in my copending application, Serial No. 296,792.

In the drawings the same reference numeral appearing in several views is to be understood as referring to the same or the equivalent part throughout.

Figure 1:
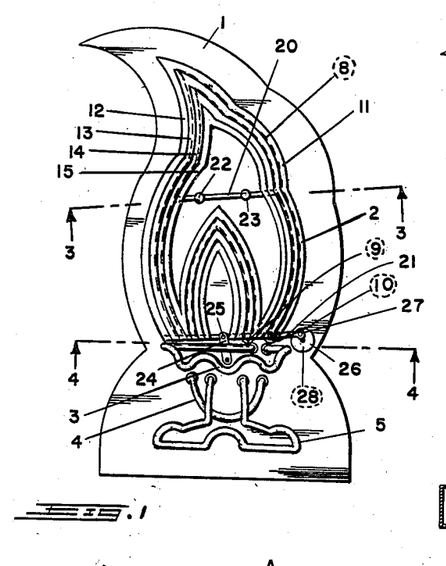
Figure 1 is a front elevation of a luminous display device made according to this invention in which a flame effect is produced by the reciprocation of a lens structure in front of the gaseous conduction lighting tube which is formed in the outline of the flame. The effect in this case takes place along and immediately in the vicinity of the tube.
Figure 2:
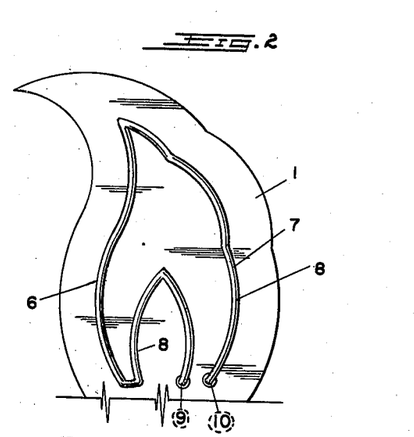
Figure 2 is a front elevation of the upper portion of the same device with the lens structure removed to expose the tube to view to more clearly show its form.

In the device shown in Figure 1 and the related views a gaseous conduction lighting tube sign is constructed in all essential particulars according to standard practice with luminous tubes on the face of the sign following the major features of a design to be represented. The internal connections to the tubes for supplying high tension current, being well known, are not shown. The animation effect is, according to this invention, provided by a refractor member which is positioned in front of and out of contact with the tubing and shifted with a novel movement in front of the tube sections to variously condense the light therefrom into beams and sweep the field of view with them. The animation device is practically an attachment to a standard sign and may be applied even to signs which are already in service to produce animation effects along tubes designed in the usual way to represent designs.

The refractor member is a lens structure having one or a plurality of elongated lenses following generally the outline of the tubing and movable crosswise thereof along a plane positioned at about the focal distance of the lenses from the plane of the tube sections. Thus as each lens passes in front of a tube section it condenses a sector of the rays into a beam of narrow divergence crosswise of the tube axis and sweeps the field of view with the beam. The intensity of this beam is a function of ray condensation in one direction that is, crosswise of the tube axis, and free divergence in another direction perpendicular thereto that is, lengthwise with the tube axis. The drop in intensity with distance is thus greatly reduced over that of the beam from a source freely exposed to view and is comparable to that of searchlights of medium deviation.

As each lens passes across a tube section it automatically selects certain ray bundles originating at various points in the gas column for the projected beam. A true beam of high intensity is thus projected for a considerable range of positions each way from the perpendicular to the tube even though the distance of the individual lens from the tube center is changing. The theory of condensation from a source of the type contemplated is set forth below in connection with the diagrams of Figures 18 and 19, it being understood that the invention is not be limited in any sense by any interpretation of the theory set forth.

A very slight movement of a lens across a tube suffices to sweep across the entire field of view. An observer in the path of the sweeping beam will see a bright flash of light when the beam crosses his position. When the refractor includes several lenses as shown in Figure 1 and related views, he will see several flashes of light for each traverse of the lens structure. If now an individual lens is identical in outline with the tube, he will see the entire tube brilliantly lighted as the beam crosses his position, provided that the lens moves across the tube parallel with it.

But if the lens crosses the tube at a slant, his position will be covered by different portions of the beam originating at different points along the tube as it sweeps across the field of view. He will consequently observe a bright region move along the tube according to the way the lens slants. If the lens structure includes several parallel lenses he will see several bright regions move along the tube. Now if the lens structure moves backward across the tube, the bright region or regions will move along the tube in the opposite direction. But if the lens structure reciprocates across the tube at an opposite slant thereto for each opposite movement, the bright region or regions will always move along the tube in the same direction. This is the first component of the flame action.

Now if the slant of the lens to the tube changes as it moves across the tube until it is parallel with the tube just as it passes between the tube and the observer, he will see a bright region move along the tube increasing in length as it moves until it covers the entire length of the tube. If this bright spot to his view starts from one end of the tube and increases in length at the same rate that it moves, the tube will appear to light up from one end to the other. Or if we now consider the multiple lens unit moving across the tube at changing slant until at one instant one lens is in alignment with and parallel to the tube, he will observe a series of bright regions moving along the tube and increasing in length as they move until at one instant the entire tube is bright to him in his position. This is the flaring effect which we will treat as the second component of the flame action. In the description of the mechanism below I will explain how this movement is secured in a preferred embodiment, it being understood that various other mechanical arrangements might be used.

In this connection it will also be apparent that there will be a pulsing effect due to the peculiarities of the mechanism which we will treat as the third component of the flame action in simulation of the flickering of a flame. By the use of parallel tubes of contrasting color emission as explained below in connection with the description of Figures 24, 25 and 26, the effect of changing colors in the flame may be added to those above. By various modifications of the lens structure and the mechanical drive means various other effects may be secured.

In the device of Figure 1 and the related views the sign body is indicated by numeral 1 and the animation unit proper by 2. Luminous tubes 3, 4 and 5 are formed in the outlines of a fire pot and exposed to direct view. Two outline tube sections 6 and 7 representative of outline features of a flame and combined as a single tube, indicated by numeral 8, and terminate in electrodes 9 and 10 which turn backward into suitable terminal housings in the sign body. The electric connection within the sign is conventional and not shown.

The refractor or lens unit 11 is movable in front of the tube 8 along a plane positioned at about the focal distance from the tube. It comprises a plurality of substantially parallel, elongated lenses 12, 13, 14 and 15, which follow in general the outline of the flame. This construction may be taken as typical of various displays of the general type, subject to various modifications utilizing features of the invention described below in connection with other views. Thus two parallel tubes of contrasting color may be used as described in connection with the drawings of Figures 24, 25 and 26. Or a pair of refractors, one movable with relation to the other, one in front of the other, of the general type shown in Figure 11 and related views may be used, either with single tubes in the form of feature outlines of the design or double tubes of contrasting color in the form of features of the design. When double refractors are used in front of outline tubes the effect, instead of appearing in the immediate vicinity of the tubes, will appear over an area for some distance on both sides of the tubes, thus introducing an additional component in the action.

The beams projected by the device of Figure 1 and related views sweep the field of view in a general horizontal direction. The tubes are formed to extend generally in a vertical direction and the lenses cross them from one side to the other. The field of view over which this display will be clearly distinguished will be comparatively wide and shallow as applies almost universally to the cases of advertising and decorative displays. The same applies to the display shown in Figure 11 and related views.

The lenses of the refractor essentially provide for the condensation of rays crosswise of the longest dimension of the illuminants, thus producing beams of long and narrow cross section, the longest dimension corresponding in direction generally to the longest dimension of the illuminants. Preferably the lenses are of the "cylindrical" type, the cylindrical axes corresponding in general direction to the longest dimension of the corresponding illuminants. Inasmuch as other sections are also suitable for this purpose I use the term "lens" in the broad sense of including any refracting formation functioning as the lenses of the drawings and the expression "axis of refraction" in the claims in the generic sense of including the cylindrical axis of an elongated lens having a cylindrical surface extending in the general direction of the corresponding illuminant, and also including the equivalent reference axis of any other refracting element similarly producing a beam of narrow divergence crosswise of the illuminant.

The illuminants may be formed with various decorative or inscription outlines, and consequently the corresponding lenses will have somewhat similar outlines, the axes of refraction following the design or inscription outline with certain modifications arising from the needs of individual cases as to preferred beam direction.

Preferably the lenses move slantwise across the illuminants, as shown in the various embodiments hereof, the resulting beams sweeping an observer position in such manner that the beam from various different sections of a given illuminant will cover his position at different times. For some purposes this may be departed from and the field of view swept by the entirety of the beams projected at one time. That is to say, from any position in the field an observer will see the entire illuminant lighted for an instant and dark at another instant. The term "field of view" is used to designate the area over which a given display is ordinarily expected to be clearly distinguished, the sweep of the beams being preferably, but not necessarily, confined to this area.

Figure 3:
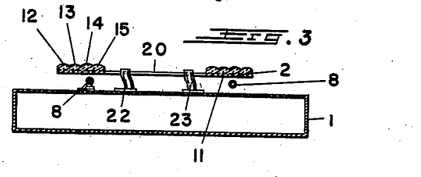
Figure 3 is a cross section of the same taken as indicated by the section line 3—3 in Figure 1 to show a mounting detail of the lens structure or refractor.
Figures 4, 6, 7, 8, 10:
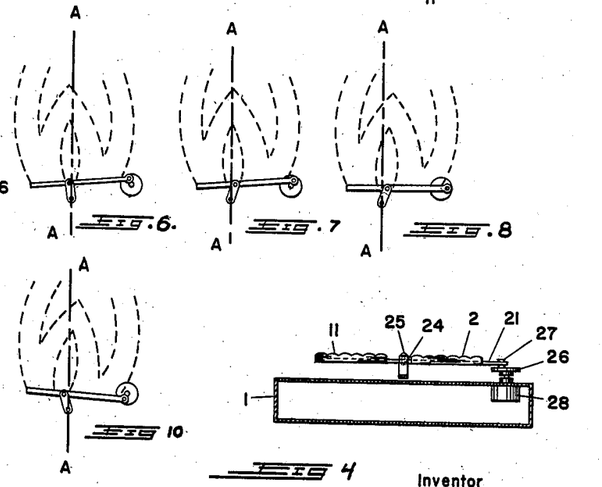
Figure 4 is a cross section taken as indicated by the section line 4—4 in Figure 1 to show the details of the driving assemblage.
Figures 5 to 10 are diagrams showing the positions assumed by the lens structure with relation to a vertical reference line for a sequence of positions and slants of the lenses with relation to the tube throughout a single cycle of action to illustrate the production of the upward component of the flame illusion.
Figure 5:
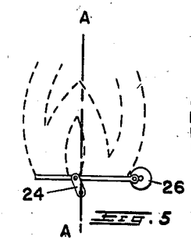
Figure 9:
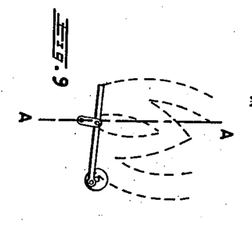

The refractor may be made of any suitable material such as cellulose acetate or any other of the transparent plastic materials now common on the market. The cross bars 20 and 21 on which it is mounted may conveniently be molded to the lenses. The cross bar 20 is mounted to the sign body by the soft rubber posts 22 and 23 which maintain a fixed spacing of the lenses from the sign body but permit movement in any direction within certain limits by the mechanism attached to bar 21. This mechanism consists of a free-floating link 24 attached to the bar by the pin 25, and a crank 26 pivoted to the bar at the point 27. The crank is driven by any suitable device, such for instance as the motor 28 indicated in Figure 1 and shown in Figure 4. The bar 21 is moved in a path spaced from the sign body the same distance as bar 20 by its attachments. The view in Figure 3 shows the details of the upper bar mounting and Figure 4 shows the details of the lower bar mounting.

Figures 5, 6, 7 and 8 show diagrammatically the movement of the lenses from left to right across a vertical reference line A—A. The progression from right to left is shown by Figures 8, 9, 10 and 5. From these views it will be apparent that the slant of the lenses with relation to the tube constantly changes and consequently the length of the bright areas is varying. There will be a point on each side movement when the tube and certain of the lenses will be in alignment at which point the bright area will appear to have flared upward. The flame afterward will appear to vanish upward in a natural manner tube shown in Figure 32 in carrying out the invention as typified by Figure 11 and related views. Multiple tubes of contrasting color may also be used. The lenses may also have special forms.

Figure 11:
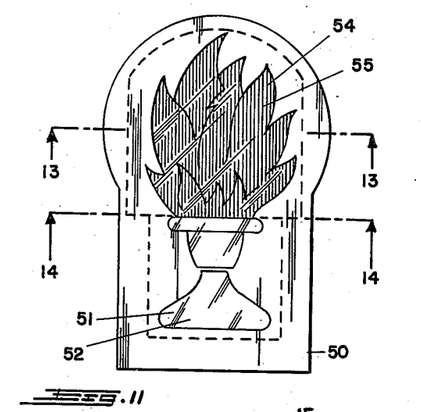
Figure 11 is a front elevation of an internally lighted sign in which a flame effect is produced by reciprocating lenticular refracting members relative to each other in front of luminous tubes to produce the effect of motion lengthwise of the tubes with a peculiar flaring action described below. In this device the effect is distributed over the display surface and not confined to the tube outlines.

Figure 11 is a front elevation of a sign representing a flame in a fire pot. The sign body 50 has a cut-out 51 representing the outline of the fire pot behind which is secured the glass 52 suitably finished to represent the details of the pot. The lighting tube 53 in the general outline of the pot is positioned behind this cut-out to light it. An additional cut-out 54 is backed by the lenticulated glass 55. This glass is smooth on the front surface and may be finished to represent details of flame, care being taken to avoid rendering this surface light diffusive to such a degree as to interfere with the effect. Transparent colors may be used for this purpose, although a small amount of pigment body may be permitted in order to improve the day effect.

Figure 14:
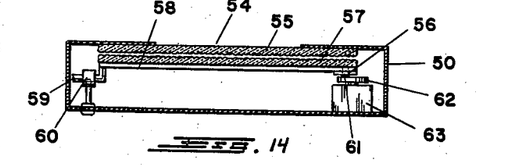
Figure 14 is a cross section taken as indicated by the section line 14—14 in Figure 11 showing the drive elements.
Figure 15:
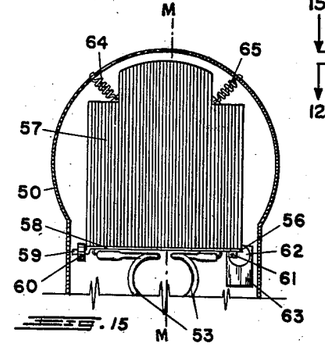
Figure 15 is a front elevation of the main elements of the device as seen along the section line 15—15 in Figure 13.

Behind the glass 55 and parallel thereto is mounted a movable glass 57, also lenticulated, and disposed to be shifted in a plane parallel to the cover glass. The bottom of the glass is supported by a cross bar 58 which has a sliding extension 59 reciprocatingly held in the swivel bearing 60. The opposite end of the bar has a bearing 56 which turns on the stud 61 on the crank 62 driven by the motor 63. The upper edge of the glass is held by two springs 64 and 65 which are strung to the sides of the body as shown in Figure 15. This glass member has been removed to show the tube grid 67 underneath it in Figure 12. In this view the transformer 68 is shown supplying current to both tubes which are connected together in series. The details of the drive are shown in Figure 14, it being understood that strict proportioning in the views has been departed from in consideration of the necessity of clarity. In each particular application of the principles illustrated herein the contour of the lenses, pitch and spacing of the members and spacing with relation to the tubing must be determined by the conditions of the case.

Figure 16:
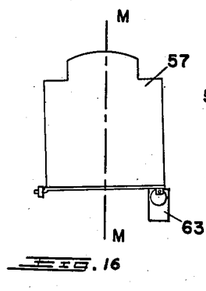
Figures 16 and 17 are diagrammatic illustrations of the movement of the movable refracting element with respect to a vertical reference line M—M to show the principle of the device as regards the production of the vertical component of the effect.

In Figure 15 the movable glass is shown in the position it occupies when the crank stud is in the extreme left position. As the stud revolves 90° to the upright position the right side of the glass is lifted upward and the whole glass shifted to the right to the position shown in Figure 16. In this position the lenticulations are crossing each other angularly, producing an upward component in the action. Now a certain transverse action is present in this device according to the detailing shown in Figures 27 to 30. Just how much transverse action is present, or if it be substantially eliminated, depends on the relative pitch of the lenticulations on the two glasses. For a realistic flame effect a certain amount of cross action is desirable and for this reason I have chosen to illustrate the device with the details shown, it being understood that they may be departed from for various purposes within the purview of the claims hereof.

Figure 17:
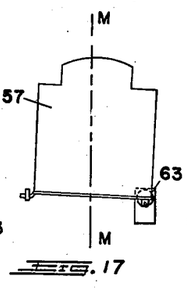

The action has a vertical and a horizontal component. As regards the vertical component, or the effect observed along the direction of the lenticulations, the action will be rapid at the beginning of this movement from the position shown in Figure 15, and slowest at the position shown in Figure 16. The number of bright areas appearing along one of the lenses will depend on the crossing of the lenticulations of one member by the lenticulations of the other, or in other words, the pitch of the lenticulations and angle of the lenticulations of the two refractors to each other. The vertical reference line M—M of Figures 16 and 17 may be taken as dividing the maximum angle which the lenticulations of the two sheets make with each other for the extreme vertical positions of the crank. In these positions the horizontal displacement of the moving member is maximum in speed, while at the positions of Figure 15 and 180° displaced from that position the horizontal movement is minimum but the rate of change of the angles is maximum. Consequently it is at the ends of the movement that the flaring effect takes place, while intermediate thereof the flame action is relatively steady.

A horizontal component in the effect is introduced by the sweeping of the field of view by the beams as is explained below in connection with the diagrams of Figures 27 to 29. A peculiar effect is thus produced due to the changing actions at different points in the cycle as between these different effects. To produce a convincing flame effect, or for that matter, any natural waving effect such as a flag waving, etc., it is necessary to make a number of empiric tests to develop the proper illusion.

According to this invention very brilliant effects may be produced due to the fact that there is no practical limit to the intensity of gaseous conduction lighting tubes. As much light as desired may be generated without involving any corresponding change in the construction or operation of the device. An extremely high utilization of the light developed is attained due to the fact that the entire sector of the rays of the tubes which is intersected by the refractors is directed forward into the normal field of view, or at the most with but small percentage of light scattered into non-useful directions. If suitable reflectors be applied behind the lights to direct forward the corresponding backward sectors of the rays, utilization factors of from 75 to 90 percent can be attained. It is to be noted that ventilation may be easily provided without interfering with the essential elements of the device when necessary.

The refractors may be constructed of glass or any other suitable material such as vinyl chloride, cellulose acetate, methyl methacrylate, or any other of the commercial plastics. By the judicious selection of plastic sheeting of suitable physical characteristics the lenticulations may be reduced in pitch and the sheeting in thickness until the stretch of the material and contraction and expansion as compared to the pitch distance of the lenses becomes the limiting factor. The movement necessary to produce a given effect decreases directly with the lenticulation pitch and consequently the cost of the device, even when constructed in quite large models, may be very moderate and but a small fraction of that of devices constructed by any known prior art method.

Various types of lights may be used, the invention not necessarily being limited to elongated illuminants except where specifically so claimed. The term "illuminant" is used in the broad sense in the claims as embracing any type of primary light source and any object or surface rendered luminous by any means and functioning as described.

Figure 27:
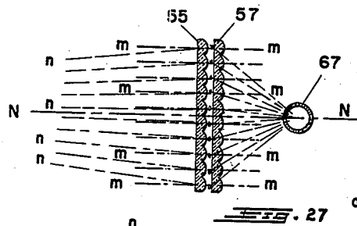
Figures 27 to 30 are diagrammatic cross sections of one of the tubes and corresponding portions of the refracting members showing the projected beam conditions for several positions of the refractors relative to each other during a cycle of operation, with the movement of one projected beam away from a given position and its replacement by another regarded as the measure of the cycle.
Figure 28:
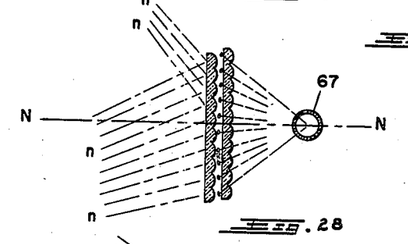
Figure 29:
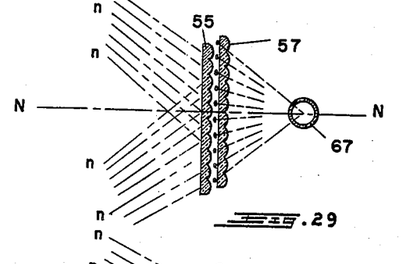

The horizontal or transverse component of the effect is illustrated by the diagrams of Figures 27 to 29. This component may be distinguished and be followed by the slower movement of broken flames.

This effect is modified to a certain extent by the horizontal component of the picture outline, there being in this technique endless opportunity for the exercise of artistic skill in the development of animation effects.

Figure 18:
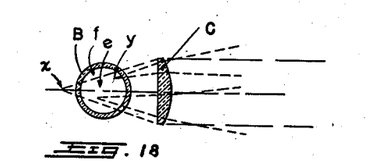
Figure 18 is a diagrammatic illustration of a tube and lens couple of that device illustrating the theory of projection involved.
Figure 19:
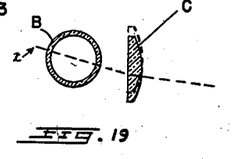
Figure 19 is a similar illustration showing the theory of the beam sweep.

Figures 18 and 19 are illustrative of the optical system formed by a gaseous conduction lighting tube and a cylindrical type lens coextensive with the same. The tube B having a glowing gas column substantially filling its bore, is associated with a lens C positioned from the tube center a distance, preferably but not necessarily, less than the focal length of the lens. It will be found that a beam will be projected of narrow divergence crosswise of the tube, and this will hold true for a very material variation of the spacing. This beam will be surprisingly bright, particularly in view of the fact that the source is not concentrated but diffused over the bore of the tube a distance which is considerable as compared with the focal length of the lens.

Considering now in Figure 18 a point $x$ of focal distance spacing from the lens and the space $e$ enclosed by the ray lines from such a point to the lens edges. It is immediately apparent that every point, $y$ within this space is contributing a wedge shaped section of rays to the projected beam, and that the greater the beam divergence considered, the greater the amounts of this contribution. Furthermore, the percentage of rays so collected to a useful end will be less for points close to the lens and greater for points distant from the lens. If the beam divergence is considerable, then a certain amount of light will be collected even from the space $f$ outside of the wedge from the focal point. It has been found that beams so developed are comparable in intensity with what might be collected from filament lamps allowing for the ordinary variations in the filament mounting and sag.

In Figure 19 the lens is shown in a position displaced crosswise of the tube; its former position being shown by broken lines. The chief ray of the projected beam is shown by a broken line and carried backward to what will now be the equivalent focal point $z$. From this it will be apparent that we have very much the same condition as in Figure 18 with the beam thrown sideways of the tube and a different collection of ray bundles entering the projected beam. Thus the beam is swept across the field of view for very considerable angles of view with little reduction in intensity. A loose focusing is not only permissible in spacing the lenses from the tube but desirable to this end. The ordinary inaccuracies of construction of electric signs are therefore of little consequence in the application of my invention to typical signs of the prior art.

Figure 20:
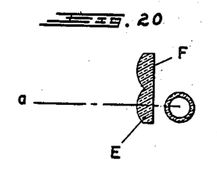
Figures 20 to 23 are diagrammatic cross sections of a tube and refractor assemblage in various positions relative to each other during a cycle of operation, with the movement from one lens center to the center of the adjacent lens treated as a cycle.
Figure 21:
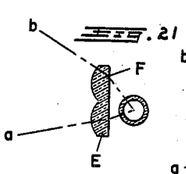
Figures 22, 23:
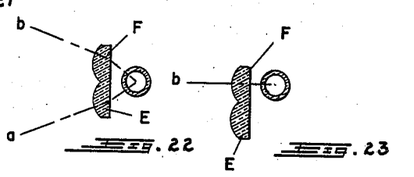

Figures 20 to 23 show the manner in which the beams of light condensed by the lenses are swept across the field of view by the movement of the lens structure one lens spacing distance across the tube, two lenses only being shown for simplicity. In Figure 20 the lens E is directly in front of the tube and chief ray $a$ of the projected beam goes straight forward. Lens F is still too far to one side to collect a substantial beam so no ray is traced through it although a certain amount of light will be projected through it. In Figure 21 the lenses have been displaced downward on the drawings and the beam indicated by ray $a$ has been swept downward. The beam through lens F is now indicated by chief ray $b$. In Figure 22 the beams are both deflected the same amount, and in Figure 23 the movement is complete to the displacement of one lens spacing. The chief ray through lens F is now projected straight forward.

Now an additional component of the flame effect can be explained. An observer in front of this display will observe the bright spot at any point along the tube, not merely through a lens directly in front of the tube, but through lenses to a side of the tube at the instant the beam therefrom first begins to cover his position. Depending of course on the amount of beam divergence, this will be at some instant before each lens reaches the tube, while he will see the last of the beam leaving his position from the lens which has passed the tube. There will therefore be a certain flickering or jumping of the light spot across the tube as the beams cover and uncover his position, which effect enhances the illusion of flame action.

Figures 24, 25, 26:
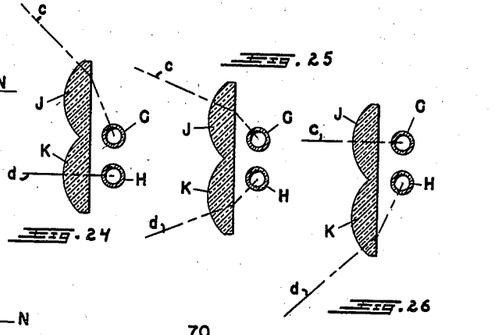
Figures 24, 25 and 26 are diagrammatic cross sections of a modification of the device in which two tubes of contrasting color emission are used behind refracting elements designed to produce a two color effect along the design represented by the tubes.

Figures 24, 25 and 26 illustrate the use of two tubes of contrasting color emission to produce a color change effect. The tubes are indicated by G and H. The refractor is represented by but two lenses J and K. The chief ray of the beam condensed from tube G through lens J is indicated by $c$ and the principal ray from tube H through lens K by $d$. The action illustrated by these views produces a color change to a person in the field of view nearly ahead of the device at the region of these tubes from the color of one tube to the color of the color of the other. By carrying the movement of the refractor further in each direction, a wider field is spread for the two color effect. The color change effect will however be comparatively very much restricted to the immediate vicinity of the tubes as contrasted with the effect produced by the construction in which two refractors are used with two tubes and in which the illusion is spread for some distance from the tubes.

The scheme shown in Figures 24, 25 and 26 by various adaptations may be applied to the device of Figure 1. The tubes may be spaced close to or spread from each other and parallel or at varying distances from point to point according to the effect desired.

The device shown in Figure 11 and related views utilizes two refracting members one in front of the other in front of luminous tubes which do not conform in particular to the effect to be produced. The effect as observed is produced by the sweeping of the field of view by light beams projected by the refractors, so that at any instant of time and from any normal point of view the action seen corresponds to the beam coverage of the observer position, in this sense being similar to the action produced by the device of the previous views.

However, the use of double refractors produces luminous regions on the display surface more distant from the tubes, so that the luminous tubes may be treated as general line source illumination over the background and the effect may be controlled by the construction of the refractors and the manner in which one is moved relative to the other. The flame action lends itself particularly to this simplified treatment, advantage being taken of the outlining of the display surface to delineate flame by the shape of the surface over which action appears and other technical details explained below.

Figure 32:
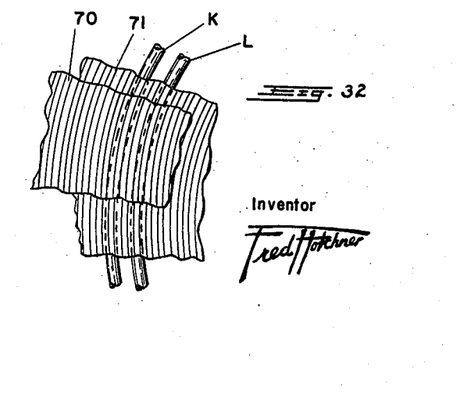
Figure 32 is a fragmentary front elevation of an assemblage of two tubes of contrasting color emission with a pair of refractor members following the outline of a pictorial effect such as a portion of the flame design of Figure 1 and illustrating the adaptation of double refractors to devices of that class, and also the use of double tubes with single or double refractors to produce two color effects.

Tubes may also be given particularized shapes characteristic of the design as exemplified by the from the action which appears to take place lengthwise with the lenticulations, and is a function of the focal lengths of the lenticulations, their pitch on each of the two members, the spacing of the members from each other and the spacing of the members from the tube. We will consider here the simple case of members having lenticulations of the same pitch and of such focal length and spacing from the tube that the foci fall between the members. These diagrams are not made to scale and are to be understood as generalized to illustrate the principles involved.

In Figure 27 the lenses of the two members are in registry so that if we draw a series of parallel lines m—m parallel to the normal N—N through the tube, with the lines passing through the centers of curvature of the lenses, we may analyze the action by the technique of discovering the images of the tube and regarding them as sources of the projected beams.

Assuming now that the curvature of the lenses and the index of refraction of the material are such that the images of the tube all fall between the members. In all practical cases, since the lenses have cylindrical surfaces, these images will fall beyond the centers of curvature, which means that the images above the normal N—N are above the corresponding parallels and those below the normal are below the corresponding parallels. Allowances, of course, are to be made for the varying image distances from the lenses due to the varying source distances and for the partial shielding of the lenses by each other at the more acute angles, with consequent distortion of the images. All conditions considered, it is found that the images, now considered as sources of light for the lenses of the front member, are displaced upward and downward away from the normal N—N.

Chief rays n are now drawn from these images through the centers of curvature of the lenses of the front member. It will be found that the elemental beams thus projected form a compound beam which converges toward the normal N—N. This beam may, of course, be treated as a diverging beam originating at the point of convergence forward of the display. Since this point of convergence will in all cases be in direct line with the observer, so far as he is concerned, the resulting effect takes place at the display surface.

Figure 30:
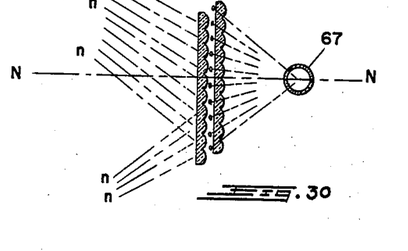
Figure 31:
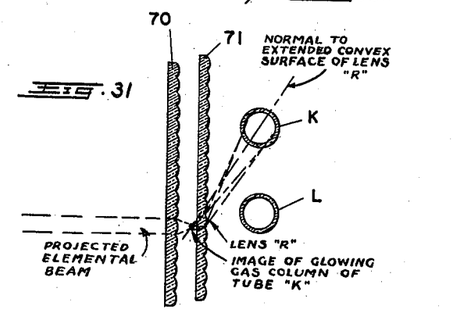
Figure 31 is a diagrammatic cross section of a modification of the device in which two tubes of contrasting color emission are used to produce a two color effect over a given surface by the movement of the refractor.

As will be seen from the successive views of Figures 28, 29 and 30, this beam sweeps downward as the front refractor is moved downward with respect to the rear refractor and another beam appears above it and moves downward until it occupies the position of the first beam considered when the members have shifted one lens spacing distance. In other words, the field of view has been swept once with the beams. Now the observer will see an action across the display surface transverse of the lenticulations by virtue of the fact that he is covered in his position by each of these compound beams from a number of angles. Or in other words, the points of convergence of the beams regarded as sources of light to the observer, move across the display surface to his view, and are seen by him for some distance each side of the tube in their travel.

If now the lenticulations of one member are slanted with respect to those of the other, the observer will see these bright areas moving with a component lengthwise of the lenses. By variations of the slant various speeds lengthwise of the lenses may be had. What is particularly interesting however, is the fact that the speed crosswise of the lenses may also be controlled by variations of the lens pitch on the two members, even to the extent of eliminating the cross movement entirely and confining the movement to the lengthwise component.

Figure 12:
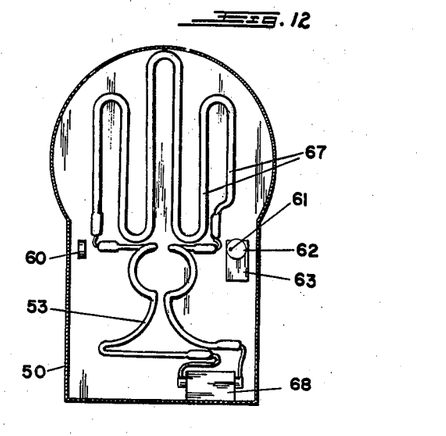
Figure 12 is a front elevation of the same device with the face and movable refracting element removed to expose the luminous tubes and transformer and motor. This view is taken as indicated by the section line 12—12 in Figure 13.
Figure 13:
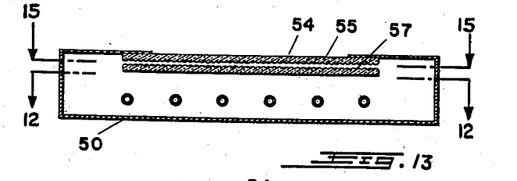
Figure 13 is a cross section of the device taken as indicated by the section line 13—13 in Figure 11.

Thus the effect is spread over the display surface for some distance from the tubes and a broad surface may be served by a grid of tubes as shown in Figure 12. These tubes may if desired for particular effects be given conformations characteristic of the design as shown in Figure 32. In this view I have shown two refractors 70 and 71 having lenticulations which follow the same outline as the tubes. The tubes K and L are of contrasting color to provide a multi-color effect.

These various details may be variously combined for various purposes. The tubes may be conformed to design features with the lenses constructed as shown in Figure 11 and related views, or the lenses may be conformed to design features or other outlines of functional character and the tube or any desired form. Single or multiple color tubes may be used in any number or outline desired.

The terms of the claims are to be broadly construed as embracing all substantial equivalents thereof, and in particular:

The term "inscription" embraces all symbolic, decorative or descriptive conformations.

Certain features of my invention may be applied to display devices of different general types than those shown herein, such for instance, as shown in my Patents Nos. 2,097,122, 2,097,123, and 2,137,239. The term "light interceptor" is intended to also embrace interceptors of the types shown in said patents.

The term "animation" embraces any action effect.

Terms setting forth a plurality of coextensive illuminants are to be understood as embracing single illuminant grids having a plurality of coextensive series portions.

Having thus described my invention, what I claim is:

1. An animation producing device including a plurality of elongated illuminants spaced from each other and extending in the same general direction across an area over which the illusion of animation is to be produced, a lenticular refractor coextensive with and in front of the same and having a plurality of lens formations projective of images of said illuminants substantially covering said area, a second lenticular refractor positioned in front of the first and having a plurality of lens formations focused on the plane of said images and projective of various light beams to various positions in the field of view for various positions of said refractors relative to each other, and means to move one of said refractors slantwise across the other refractor to sweep the field of view with said beams to produce the illusion of animation in the general direction of said illuminants.

2. An animation producing device including a plurality of elongated illuminants spaced from each other and extending in the same general direction across an area over which the illusion of animation is to be produced, a lenticular refractor coextensive with and in front of the same and having a plurality of lens formations extending in the general direction of said illuminants and projective of images of said illuminants substantially covering said area, a second refractor positioned in front of the first and having a plurality of lens formations extending generally in the direction of said illuminants focused on the plane of said images and projective of light beams therefrom to the field of view, which beams cover various portions of the field of view for various positions of said refractors relative to each other, and means to reciprocate one of said refractors across the other with the lenticulations thereof at an opposite slant to the lenticulations of the other for each opposite movement of said reciprocation.

3. The combination of an elongated illuminant in the form of a design which is to appear animated with a pair of refractors positioned one in front of the other in front of said illuminant and having each a plurality of refracting formations extending generally in the direction of said illuminant so spaced and contoured that for each of a number of different positions of said refractors relative to each other said formations combine optically to project beams of narrow divergence crosswise of said illuminant to various points of the field of view, and means to reciprocate said refractors with respect to each other with the formations of one of said refractors at an opposite slant to the formations of the other for each opposite movement of the reciprocation, whereby to produce the illusion of movement in the same general direction lengthwise of said illuminant across the display so formed to a person positioned in said field for each opposite movement of said reciprocation by virtue of the changing beam coverage of his position.

4. A display device having an elongated illuminant in the outline of a design along which the effect of animation is to be produced in one general direction therealong, a light interceptor member having a refracting formation coextensive with said illuminant in front of the same to view and adapted to refract the light therefrom and thereby change the appearance of said illuminant when moved in front of the same, and means to reciprocate one of said members relative to the other across the long dimension of said illuminant slantwise at an opposite slant for each opposite movement of reciprocation in such manner as to bring corresponding portions of said illuminant and said refracting formation into registry to view progressively in the same direction along said illuminant for both opposite movements of reciprocation.

5. A display device having an elongated illuminant in the outline of a design along which the effect of animation is to be produced in one direction therealong, a light interceptor in front of the same having a plurality of adjacently disposed, coextensive, refracting formations generally coextensive with said design, with the major axes of refraction of said formations of similar outline thereto, and adapted to variously modify the view thereof when moved in front of the same, and means to reciprocate one of said members relative to the other across the long dimension of said illuminant slantwise at an opposite slant for each opposite movement of reciprocation in such order as to bring corresponding portions of said illuminant and said interceptor formations into registry to view progressively in the same direction along the illuminant for both opposite movements of reciprocation.

6. A display device including a luminous inscription member having a plurality of coextensive lines of light in the form of a design extending generally in one direction, a light refracting member movable relative thereto in front of the same along a coextensive plane and having a plurality of adjacent parallel light refracting formations extending in the same general direction as said design, together with crank means and guide means associated with the movable one of said members and spaced from each other transverse of the direction of said design, said crank means being adapted to tend to shift said movable member in a circuitous path and said guide means being adapted to tend to restrain the movement of said movable member toward and away from said crank means, whereby said movable member as a whole is shifted with a turning component in such manner that said refracting means moves slantwise to view at a varying slant across said inscription member.

7. A display device including an inscription member having a plurality of substantially parallel, elongated, spaced, coextensive illuminants of contrasting color emission and a refractor member having a plurality of substantially parallel, elongated lenses extending in the general direction of said illuminants, movable relative thereto in a substantially parallel plane at approximately the focal distance of the said lenses therefrom and adapted to project beams of narrow divergence crosswise of said illuminants to the field of view, and means to reciprocate one of said members in its plane relative to the other to traverse said lenses across said illuminants slantwise at an opposite slant for each opposite movement of reciprocation.

8. A display device including an inscription member having a plurality of substantially parallel, coextensive, spaced, elongated illuminants of contrasting color emission, a pair of refractors having each a plurality of substantially parallel, elongated lenses extending in the general direction of said illuminants positioned one in front of the other in front thereof, the lenses of the rearward one of said refractors being adapted to project images of said illuminants, the lenses of the forward one of said refractors being adapted to focus on said images and project therefrom elemental beams of narrow divergence crosswise of said illuminants to the field of view, and means to reciprocate one of said refractors crosswise of the other with the lenses thereof at a slant to the lenses of the other and at an opposite slant for each opposite movement of reciprocation.

FRED HOTCHNER.